(12) United States Patent
Philipp

(10) Patent No.: US 10,457,496 B2
(45) Date of Patent: Oct. 29, 2019

(54) UNLOADING DEVICE

(71) Applicant: Rotzinger AG, Kaiseraugst (CH)

(72) Inventor: Kurt Philipp, Grenzach-Wyhlen (DE)

(73) Assignee: ROTZINGER AG, Kaiseraugst (CH)

( * ) Notice: Subject to any disclaimer, the term of this patent is extended or adjusted under 35 U.S.C. 154(b) by 0 days.

(21) Appl. No.: 15/748,711

(22) PCT Filed: Jul. 21, 2016

(86) PCT No.: PCT/EP2016/067383
§ 371 (c)(1),
(2) Date: Jan. 30, 2018

(87) PCT Pub. No.: WO2017/021160
PCT Pub. Date: Feb. 9, 2017

(65) Prior Publication Data
US 2019/0009995 A1  Jan. 10, 2019

(30) Foreign Application Priority Data

Jul. 31, 2015  (CH) ...................................... 1114/15

(51) Int. Cl.
*B65G 47/82* (2006.01)
*B65G 47/57* (2006.01)
*B65G 47/51* (2006.01)

(52) U.S. Cl.
CPC ...... *B65G 47/5113* (2013.01); *B65G 47/5109* (2013.01); *B65G 47/57* (2013.01); *B65G 47/82* (2013.01); *B65G 2812/02712* (2013.01)

(58) Field of Classification Search
CPC ........ B65G 37/00; B65G 47/57; B65G 47/82; B65G 47/5113; B65G 47/51

USPC ................................... 198/347.1, 435, 461.1
See application file for complete search history.

(56) References Cited

U.S. PATENT DOCUMENTS

| 4,494,646 | A   | * | 1/1985  | Honegger | B65H 29/005 |
|           |     |   |         |          | 198/461.1   |
| 8,342,311 | B2  | * | 1/2013  | Philipp  | B65G 47/57  |
|           |     |   |         |          | 198/345.1   |
| 2003/0223845 | A1 |   | 12/2003 | Philipp  |             |
| 2005/0232732 | A1 |   | 10/2005 | Philipp  |             |
| 2010/0108464 | A1 | * | 5/2010  | Davi     | B65G 1/127  |
|           |     |   |         |          | 198/347.1   |
| 2010/0316468 | A1 | * | 12/2010 | Lert     | B65G 1/045  |
|           |     |   |         |          | 414/273     |

(Continued)

FOREIGN PATENT DOCUMENTS

| EP | 1586520 A1 | 10/2005 |
| EP | 1818292 A1 | 8/2007  |

OTHER PUBLICATIONS

International Search Report dated Oct. 10, 2016, in PCT/EP2016/067383, filed Jul. 21, 2016.

*Primary Examiner* — James R Bidwell
(74) *Attorney, Agent, or Firm* — Oblon, McClelland, Maier & Neustadt, L.L.P.

(57) ABSTRACT

An unloading device is used for unloading products located on product carrier trays, which in turn are provided in product carrier shuttles of a chain store, onto outfeed conveyor belts. To increase unloading performance, at least two vertically pivotable outfeed belts are provided one above the other on the outlet side. For simultaneously unloading a plurality of trays, a pusher includes a corresponding plurality of pushing bars.

7 Claims, 6 Drawing Sheets

(56) References Cited

U.S. PATENT DOCUMENTS

2011/0139579 A1* 6/2011 Philipp .............. B65G 47/5154
  198/347.1
2015/0158677 A1* 6/2015 Philipp .............. B65G 47/5113
  198/347.1

* cited by examiner

UNLOADING DEVICE

BACKGROUND

Unloading devices of this type are needed in order to move piece goods kept in a temporary store as rows of products in so-called product carrier shuttles of a product store from the store onto outfeed belts. These product carrier shuttles mostly consist of four or six or even up to 24 product carrier trays, on which the product rows at the inlet of the temporary store are stored at a certain conveying speed.

In general, these are temporary stores that handle the product rows according to the First in First out (FiFo) principle. This operating principle is mostly applied to unpackaged products. The product carrier shuttles are rotatably suspended from two endless chain strands arranged in a pairwise manner. The distance between these product carrier shuttles on the chain is a function of the length and the height of the products. Also, the vertical distance of the respective product carrier trays within a product carrier shuttle is a function of the height of the product. The chain of a temporary store that is equipped with product carrier shuttles in a circulating manner is driven at the inlet thereof using a servomotor that is synchronized with the production rate, and is at the outlet also driven by a servomotor that is synchronized with the packaging rate.

The shuttle chain is here usually moved vertically upwards at the inlet of the temporary store and vertically downwards at the outlet thereof. However, in exceptional cases, this may also be the other way around. At the inlet of these temporary stores, there is a multiplicity of technical solutions known from the prior art, which allow the product rows arriving from production to be stored at a high rate. Here, the product rows are loaded onto the product carrier trays in a contactless manner only at their rate, so that the respective product row can slide onto the product carrier tray provided.

This means that at the outlet of the temporary store, the cycle rate has to be approximately 20% higher than at the inlet. Any faults along the packaging line, which are normally on the outlet side, result in an increase of the filling level of the temporary store. To ensure that this increase in filling level during production can be reduced again, the outlet of the temporary store must be capable of a cycle speed that is higher by that same 20%.

For discharging, the product rows are pushed out by a pusher from the product carrier trays onto the outfeed belt. In the process of this, the pusher penetrates the product carrier shuttle until the product row rests on the outfeed belt over its length. Subsequently, the pusher bar is retracted back by the same stroke. During this time, the product carrier shuttle cannot be moved. Mot until after the return stroke is completed can the next product carrier tray be provided again by a downward cycle of the chain of the temporary store. This process is time-consuming and considerably reduces the number of outlet cycles.

BRIEF SUMMARY

The invention is based on the object of providing a possibility for increasing the number of outlet cycles.

BRIEF DESCRIPTION OF THE DRAWINGS

A preferred embodiment example of the invention will be described below by means of the attached drawings, wherein.

DETAILED DESCRIPTION

Figure 1:
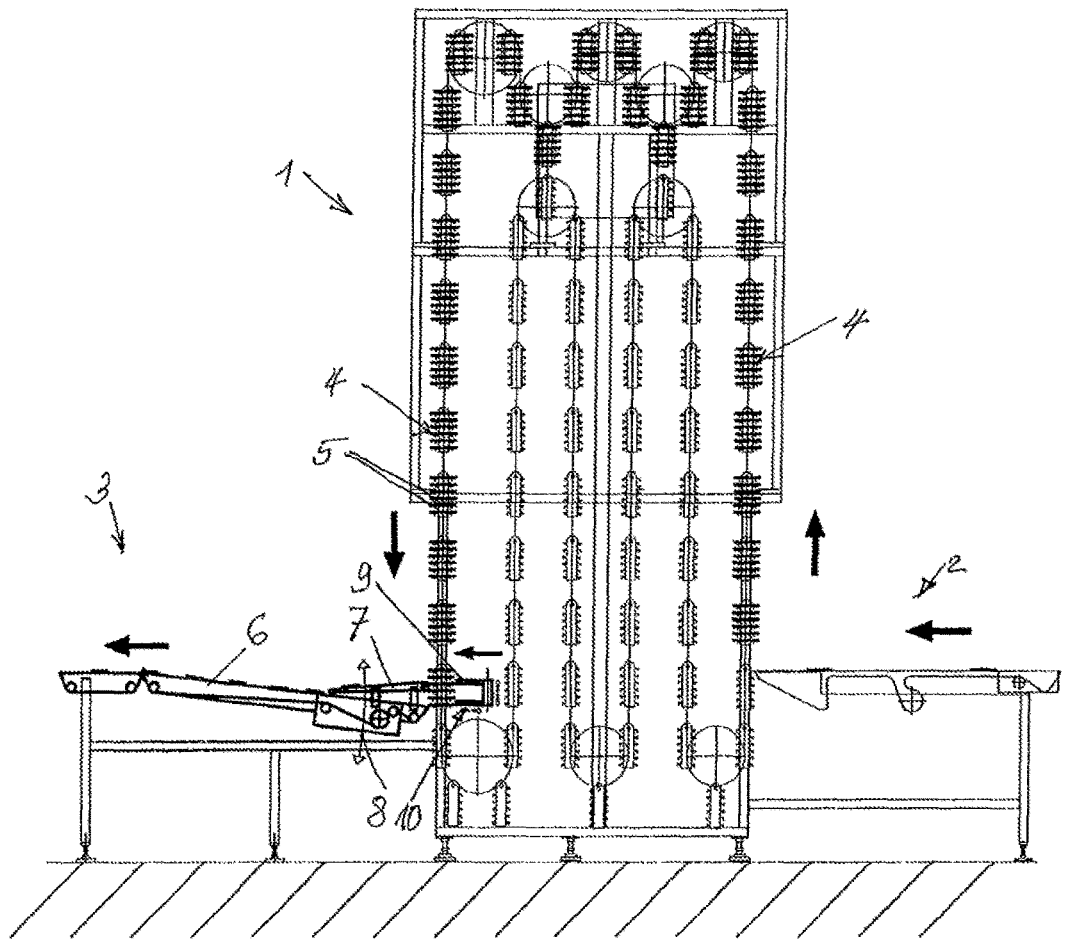
FIG. 1 shows a schematic overall view of a temporary store in a production line with an infeed and an outfeed belt.

The basic arrangement of the temporary store in which the unloading device according to the invention is used corresponds to the prior art with a frontal inlet that takes over the product rows coming from production, and transfers, also on a frontal outlet, the product rows in the direction of the packaging system. The embodiment of the invention as shown in FIG. 1 has a temporary store 1 that is known, per se, which is disposed between an infeed belt 2 coming from production and an outfeed belt 3 leading to a packaging system. The store is equipped with product carrier shuttles 4 suspended from chain strands arranged in pairs, and is equipped with six product carrier trays 5 each. The drive of the chain strands with different speeds at the inlet and on the outlet also corresponds to the prior art as described at the beginning. As mentioned at the beginning, the product carrier shuttles may also contain more or less trays.

On the outlet side, a bottom main belt 6 is provided that has mechanically connected thereto in a stationary manner an additional belt 7 located thereabove. The main belt is longer and runs at a higher speed than the additional belt. The main belt 6 is rotationally hinged on the outlet side, so that the two belts can be vertically pivoted as indicated by the double arrow 8. The additional belt extends above the main belt obliquely downwards and terminates above the main belt at a vertical distance that allows the passage of the product rows on the main belt 6. The vertical distance of the transfer edges of the two belts is the same as the distance between four trays of a product carrier shuttle. This means, if for example the transfer edge of the main belt is located at the level of the bottom tray of a shuttle, then the transfer edge of the additional belt is located at the level of the fourth tray of the same shuttle, so that the product rows can be pushed from these trays onto the belts. Of course, another vertical distance may also be provided as needed, which may extend over a plurality of shuttles.

At the level of the outfeed belt, a pusher 10 provided with two pushing bars 9 is disposed on the side of the shuttles that is opposite the outlet. The pusher has a servomotor drive that effects a horizontal movement relative to the shuttles. As the pusher moves forward, i.e., towards a shuttle, the product rows are pushed by the pushing bars from the trays located at the level thereof in the direction of flow onto the belts which are also located at the same level.

The pusher with the two pushing bars and the two downstream conveyor belts are mechanically linked to each other in an articulated manner in such a way that in each case one belt and one pushing bar are located at the level of the same tray. During product discharge, the shuttles 4 continuously move downwards. The pusher is moved vertically downwards by a servomotor synchronously with the shuttles. This means that the pushing out process of the product rows can be carried out during the downward movement of the product shuttles. Upon completion of the respective double push-out and the retraction of the pusher, the pusher and also the mechanically coupled two outfeed belts move vertically upwards, counter to the downwardly moving product carrier shuttles. As soon as the upward stroke is completed, the vertical drive of the pusher re-synchronizes with the downward movement of the product carrier shuttles and then starts a new pushing out process. The pushed-out rows lying on top of one another are transferred, via a certain speed difference of the two downstream conveyor belts, into a regular gapless product flow. In the course of this, the bottom main belt has the higher average speed, so that there will always be a corresponding gap available so that the product rows can be conveyed from the top belt in the flow onto the bottom main belt.

Figure 2:
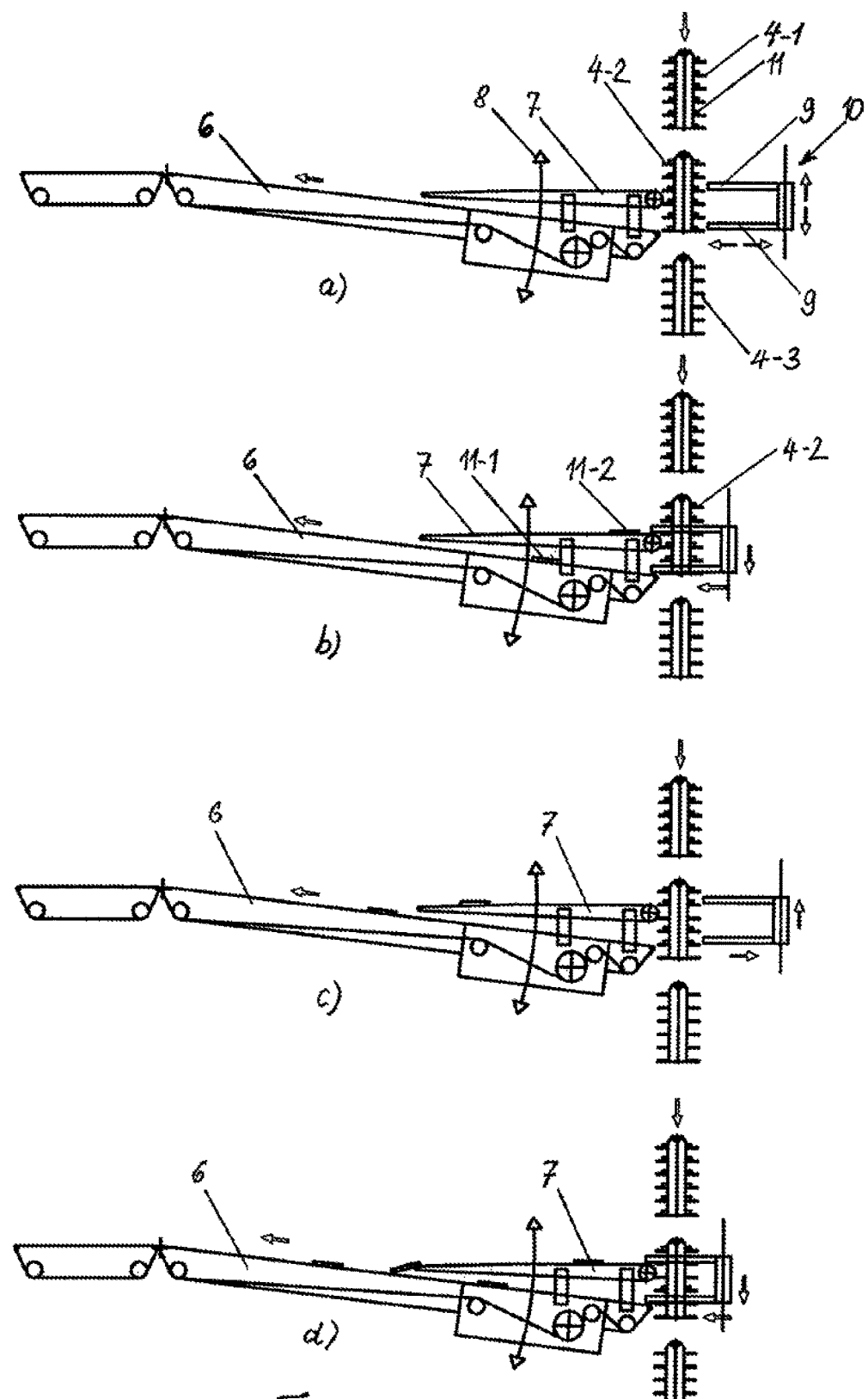
FIG. 2 shows a schematic view of the process of unloading two product carrier trays at the same time.

FIG. 2 illustrates this process more clearly in several stages. Three shuttles are shown for each step: The top shuttle 4-1 is still equipped with product rows 11. The center shuttle 4-2 is presently in the product discharge stage. The trays of the bottom, shuttle 4-3 are already empty.

In FIG. 2a, the main belt and the bottom pushing bar are located opposite one another at the level of the bottom tray of a shuttle. At the same time, the additional belt and the top pushing bar are located at the level of the fourth tray. The pusher is still in its retracted position, i.e., the pushing bars are still outside of the shuttle and the products are still lying on the trays.

FIG. 2b shows the next step, in which the pusher was moved forward, i.e., towards the shuttle 4-2, so that the respective product rows have been pushed onto the two belts. It can be seen that the product row 11-1 on the main belt has, due to the higher speed of the latter, already been moved further than the product row 11-2 on the additional belt, so that the mentioned gap exists on the main belt for the latter, when it is placed thereon.

Once the product rows have been pushed out, the pusher is retracted and is, together with the belts, displaced upwards by a vertical tray distance. This condition is shown in FIG. 2c. As a result, the second and fifth trays now move from the bottom into a position suitable for discharge.

FIG. 2d shows, corresponding to step 2b, the discharge of the respective product rows. The shuttle is emptied by a further, similar sequence of steps.

During this process, the product carrier shuttles thus no longer need to be stopped during the pushing out of the product rows, but can be moved downwards at a constant speed. Due to the simultaneous pushing out of two product rows without stopping the product carrier shuttle, the number of cycles of the temporary store outlet can be drastically increased. The arrangement is designed in such a way that the main belt at the bottom is longer than the belt disposed thereabove. The longer main belt at the bottom can be pivoted about a pivot point on the outlet side. The shorter conveyor belt provided above is mechanically fixed to the bottom, main belt to be stationary and is therefore carried along in a piggyback manner.

Figure 3:
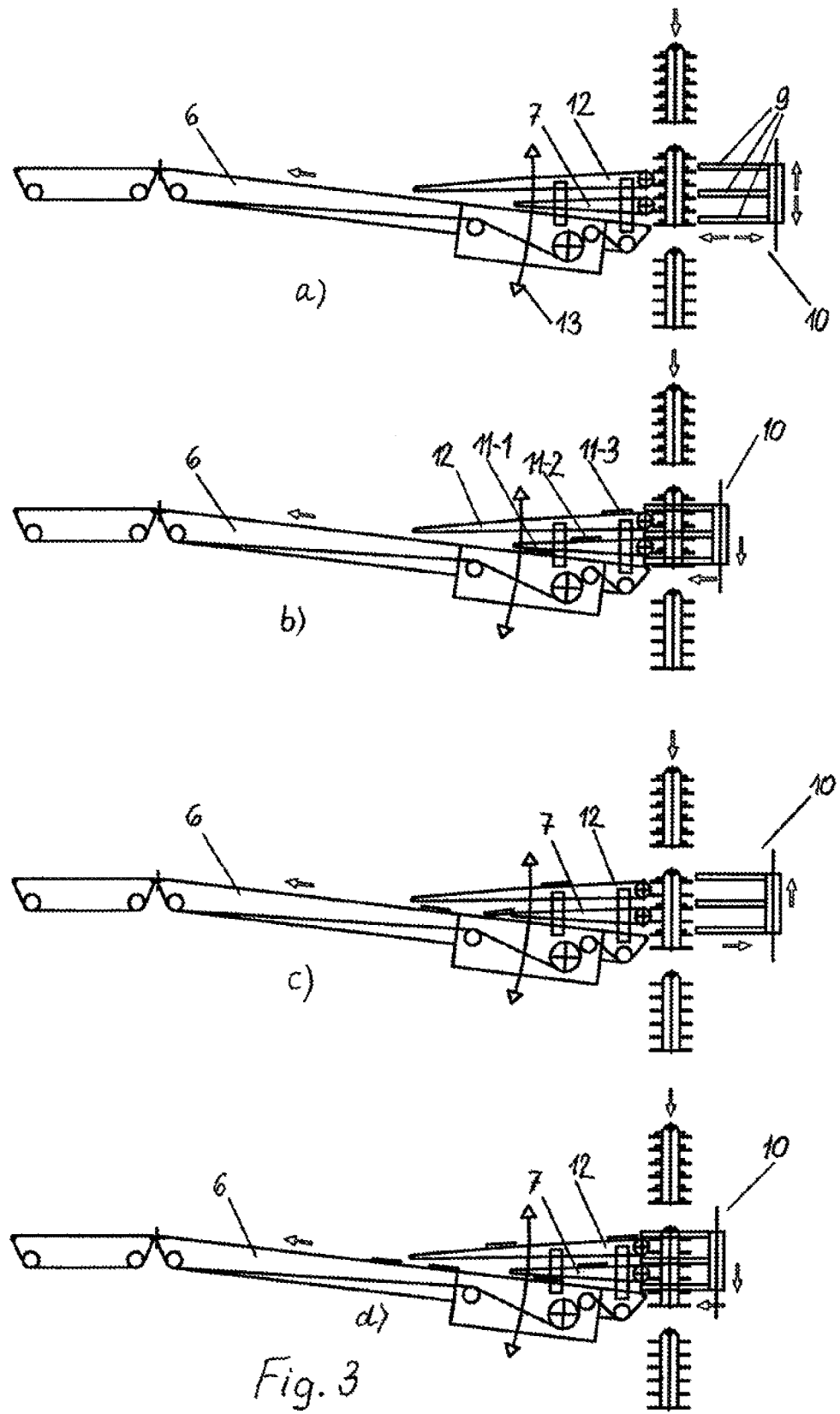
FIG. 3 shows a schematic view of the process of unloading three product carrier trays at the same time.

In the embodiment shown in FIG. 3, a second additional belt 12 is provided above the first additional belt 7, which is also mechanically fixed to the main belt 6 and thus moves vertically together therewith, as indicated by arrow 13. The upper additional belt 12 is longer than the lower additional belt 7 and runs at a predictable different speed compared to the latter. The pusher 10 is equipped with three pushing bars 9.

The process of unloading is carried out in a manner corresponding to the one shown in FIG. 2:

In FIG. 3a, the main belt and the bottom pushing bar are located opposite one another at the level of the bottom tray of a shuttle 4-2. At the same time, the bottom additional belt 7 and the center pushing bar are located at the level of the third tray, and the top additional belt 12 and the top pushing bar are at the level of the fifth tray from the bottom. The pusher is still in its retracted position.

FIG. 3b shows the next step, by which the pusher has pushed the respective product rows onto the three belts. It can be seen that product row 11-1 on the main belt, due to the higher speed thereof, has already been conveyed further than the product row 11-2 on the additional belt and that the product row 11-3, due to the lower speed of the top additional belt, again encounters a corresponding gap on the main belt when it is placed thereon.

After pushing the product rows out, the pusher is retracted again and is, together with the belts, displaced upwards by a vertical tray distance. This condition is shown in FIG. 3c. As a result, the second, fourth and sixth trays will now get from the bottom into the position suitable for discharge.

FIG. 3d shows the discharge of the respective product rows. Thus the trays have been emptied in two steps.

By means of this arrangement, an even higher unloading performance can be achieved because with each pushing out process, three product rows can be pushed out in the direction of packaging.

Figure 4:
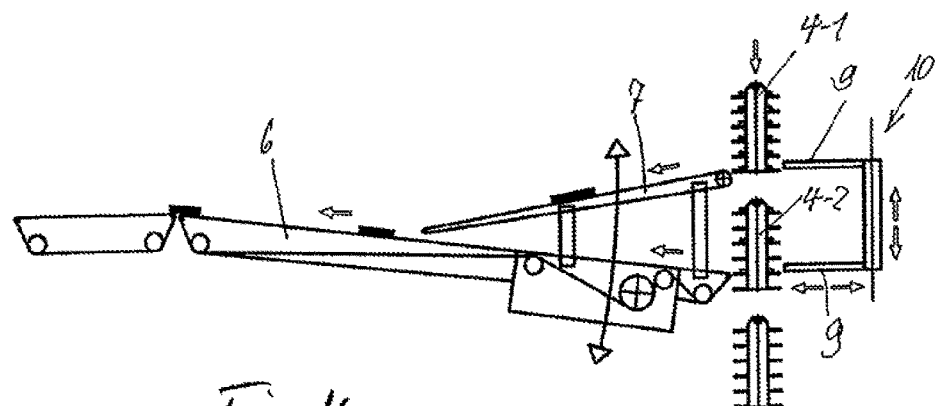
FIG. 4 shows a schematic view of an alternative embodiment with outfeed belts to two packaging stations.
Figure 5:
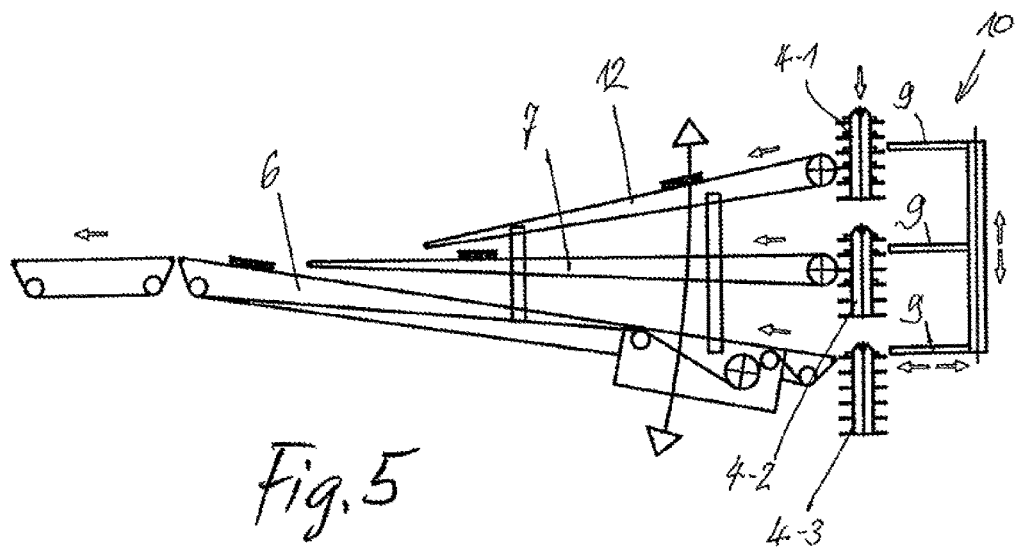
FIG. 5 shows a schematic view of an alternative embodiment with outfeed belts to three packaging stations.

In the embodiment shown in FIG. 4, the transfer edges of the two belts 6, 7 and the pushing bars of the pusher are vertically spaced apart from each other to such a degree that product rows from two consecutive shuttles 4-1, 4-2 can be discharged at the same time. FIG. 5 shows a corresponding arrangement with three belts 6, 7, 12 and three pushing bars 9, by means of which product, rows of three consecutive shuttles 4-1, 4-2, 4-3 can be discharged at the same time.

Figure 6A:
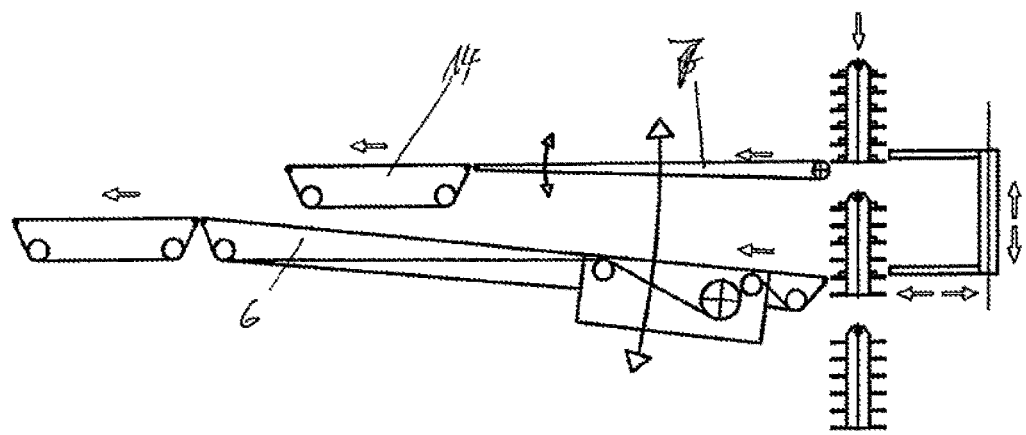
FIG. 6 shows a schematic view of an alternative embodiment with a distribution onto two outfeed lanes.
Figure 6B:
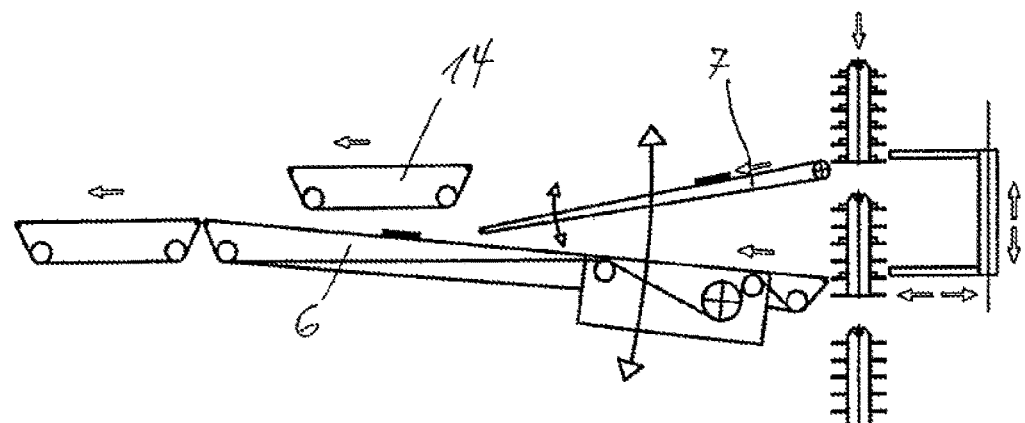

In the case of the embodiment shown in FIG. 6a, a shorter additional belt 7, which is disposed above the main belt 6, is implemented so as to foe pivotable and supplies, in its top pivoting position, via a further conveyor belt 14 that is fixedly located thereabove, a further packaging line with product rows from the store outlet. When this packaging line stops, the belt can, as shown in FIG. 6b, be pivoted downwards in order to transfer the product rows in the flow of the bottom main belt.

Figure 7A:
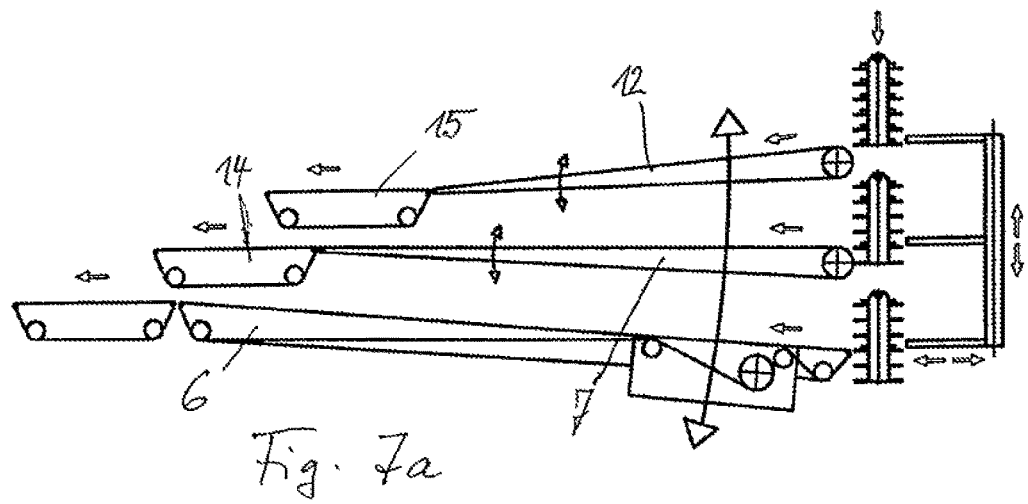
FIG. 7 shows a schematic view of an alternative embodiment with a distribution onto three outfeed lanes.
Figure 7B:
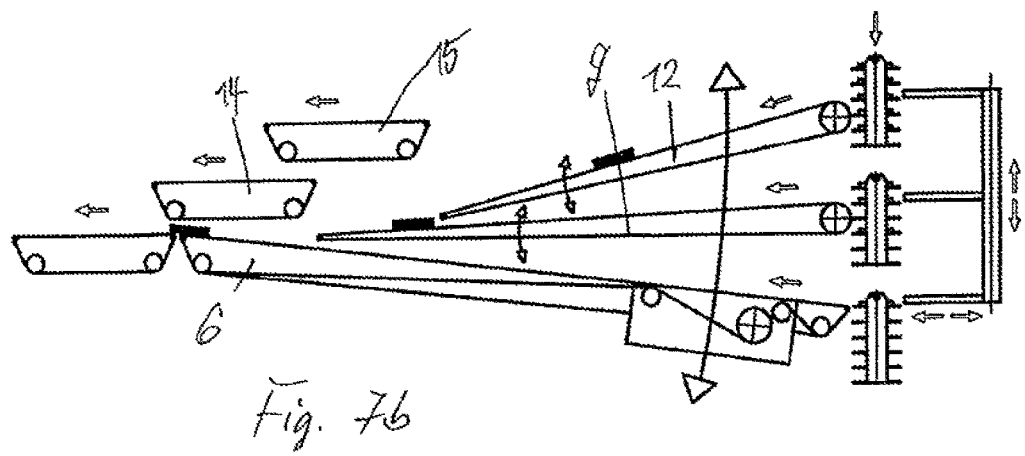

In the embodiment shown in FIG. 7a, a further additional belt 12 is provided above the first additional belt 7 and is shorter than the latter, which is also designed to be pivotable and supplies, via a conveyor belt 15 fixedly provided thereabove, a further packaging line with product rows from the store outlet. When this further packaging line stops, this further additional belt can be pivoted vertically downwards, in order to transfer the product rows in the flow of the next belt 7 therebelow, as shown in FIG. 7b.

In all the embodiments shown it is possible to align the shorter conveyor belts provided in each case above the pivotable bottom main belt, with the product carrier trays within a product carrier shuttle or with certain product carrier trays of adjacent shuttles as shown in FIGS. 4 and 5. The pushing bars of the pusher always correspond, in their vertical position, to the downstream outfeed conveyor belt.

Of course, the pivoting movement of the outfeed conveyor belts and the vertical movement of the pusher may, instead of being mechanically hinged, also be designed in each case with separate drives with correspondingly suitable control means.

It is also a matter of course that a suitable control unit for the servodrives for the various functions has to be provided. Such controllers can be realized by a person skilled in the relevant art on the basis of their expert knowledge without exercising inventive skill.

The unloading device according to the invention can systematically provide the required performance increase due to the fact that the pushing out of the product rows on several levels is carried out simultaneously with a simultaneous continuous downward movement of the product carrier shuttles, i.e., without "stop and go."

The invention claimed is:

1. An unloading device for unloading products located on product carrier trays, which in turn are disposed in product carrier shuttles of a chain store, onto outfeed conveyor belts, comprising:
   a main conveyor belt having a transfer edge and an outlet side, the transfer edge being adjacent to the product carrier shuttles and the outlet side being opposite to the transfer edge, and the main conveyor belt is hinged at the outlet side to enable vertical pivoting of the transfer edge; and
   at least one additional belt located above the main conveyor belt and being mechanically connected in a stationary manner to the main conveyor belt for common vertical pivoting together with the main conveyor belt, wherein the at least one additional belt is shorter than the main conveyor belt.

2. The unloading device as claimed in claim 1, wherein the main conveyor belt is mechanically hinged onto a vertically movable pusher.

3. The unloading device as claimed in claim 2, wherein the pusher includes a number of pushing bars that is equal to a number of vertically pivotable belts.

4. The unloading device as claimed in claim 2, wherein a second additional conveyor belt is positioned above the main conveyor belt and the at least one additional belt, and the second addition belt is fastened to the main conveyor belt.

5. The unloading device as claimed in claim 1, wherein each of the at least one additional conveyor belt is configured to be individually vertically pivotable.

6. The unloading device as claimed in claim 2, further comprising means for synchronizing the pusher with the main and additional conveyor belts and with vertical movement of the product carrier shuttles, such that a simultaneous pushing out of the product from the product carrier shuttles onto the main and additional conveyor belts is carried out.

7. The unloading device as claimed in claim 1, wherein the main conveyor belt and the at least one additional conveyor belt run at differently synchronized speeds such that a regular gapless product flow is achieved at the outlet side of the main conveyor belt.

* * * * *